United States Patent [19]
Kessler et al.

[11] 3,869,176
[45] Mar. 4, 1975

[54] APPARATUS FOR PREVENTING RAILWAY WHEEL LOCK

[76] Inventors: John Kessler, 38-14 Broadway, Long Island City; Joseph Franco, 496 Park Ave., Uniondale, L. I., both of N.Y. 11106

[22] Filed: Apr. 13, 1973

[21] Appl. No.: 350,845

[52] U.S. Cl. ................................................ 303/3
[51] Int. Cl. ........................................... B60t 17/18
[58] Field of Search ............. 188/159; 303/3, 15, 16

[56] References Cited
UNITED STATES PATENTS

| | | | |
|---|---|---|---|
| 2,012,747 | 8/1935 | Logan | 303/3 |
| 2,052,201 | 8/1936 | Logan et al. | 303/3 X |
| 2,092,416 | 9/1937 | Farmer | 303/3 |
| 2,276,812 | 3/1942 | Webb et al. | 303/3 |
| 3,240,536 | 3/1966 | Rouillon | 303/16 |

*Primary Examiner*—Duane A. Reger
*Attorney, Agent, or Firm*—Allison C. Collard

[57] ABSTRACT

A braking system method and apparatus for the type having a controller regulating the degree of brake application, an air valve, a pressure source whose application is governed by the air valve and including a dynamic braking means having load means connected across the dynamic braking motors, a lock-out magnet determining the application of the fluid pressure and an air brake whose employment is governed by the lock-out magnet the improvement comprising a pressure switch communicating with the pressure in the air brake and set at a predetermined pressure level; coupling means located between the load and the dynamic braking means for disconnecting the load means; and a conductor connected between said pressure switch and said coupling means so that when the lock-out magnet fails to regulate the application of the fluid pressure brakes and the dynamic braking motors, at the predetermined pressure level said switch sends an electrical signal through said conductor causing said coupling means to disconnect the load means from the dynamic braking motors.

2 Claims, 1 Drawing Figure

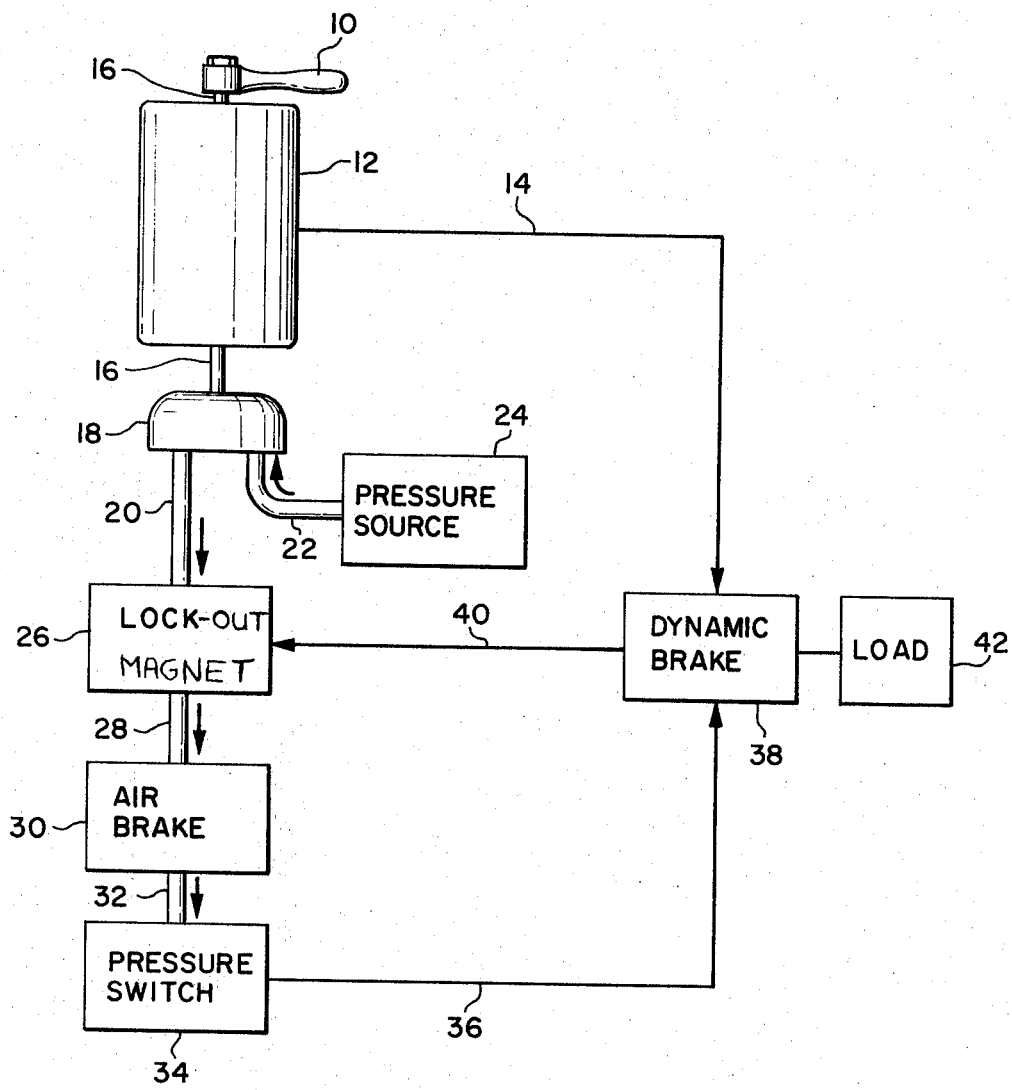

APPARATUS FOR PREVENTING RAILWAY WHEEL LOCK

This invention relates to a railway braking device in moving trains for preventing an undesirable wheel lock upon brake application.

More particularly, the present invention relates to an electronic pressure switch regulated by fluid pressure in an air brake which prevents the application of a dynamic brake when there is a malfunction in a lock out magnet or solenoid.

The operation of modern electric transit utilize two braking methods for slowing and stopping the vehicle. One method is a dynamic brake. In dynamic braking, the electric motors used in propelling the vehicle are changed into electric generators by shifting the position and direction of the magnetic field. Thus, a motorman demand for brakes converts a train's driving motor into an electric generator whose output is then derived from the vehicle's motion. This output is loaded into a bank of ballast resistors thereby converting the electrical energy into heat.

The other method of braking utilizes an application of fluid pressure. This fluid pressure may be directed against various members in the vehicle's drive train, but as usually applied, the fluid pressure urges a brake shoe against a wheel periphery. The resulting engagement produces friction which raises the temperature of both the shoe and wheel so as to convert the vehicle's forward movement into dissipatable heat.

The braking apparatus on electrical transit employ the fluid pressure brakes and the dynamic brakes coacting to form one integrated system. When the vehicle velocity is sufficiently high, a motorman's demand for brakes converts the electric propelling motors to electric generators causing a correspondingly large heating of the ballast resistors. This greatly retards the vehicle velocity owing to the functional relationship, expressed as drag, between generator armature velocity (proportional to vehicle speed) and electrical output. However, as the vehicle's velocity decreases, the utility of electric generation as a retarding force becomes severely diminished. In fact, at the lower vehicle velocities electric generation of heat is so comparatively small that efficient stopping requires the application of the aforementioned fluid pressure braking apparatus.

The prior art discloses various means for applying fluid pressure brakes as the reduction in vehicle speed diminishes the dynamic brake's effectiveness. The vehicle may then be brought to a gradual halt without the danger of sudden jarring.

The apparatus used in merging the aforesaid two braking systems often times utilized what in the art is called a lock-out magnet. It is, in effect, an electrically operated brake valve device for regulating the amount of fluid pressure urging the brake shoe against the wheel. The lock-out magnet is in turn controlled by (1) amount of electrical output (heat dissipation) in the dynamic braking system and (2) the amount of fluid pressure allowed to enter this lock-out magnet owing to the position of an operating handle on a brake control device.

When the vehicle is to be slowed down from a sufficiently high speed, a motorman's demand for brakes which is communicated through the relative rotation of the operating handle on the brake control device, directs the conversion of the propelling motors to electric generators. This causes a conversion of vehicle movement into heat at the ballast resistors. As vehicle velocity becomes sufficiently reduced, the lock-out magnet electrically communicating with the output of the dynamic brake system increases the fluid pressure to the braking system. The train is brought to a halt by the successive application of the above-described braking systems. It should be noted however, that an emergency demand for brakes communicated through the relative placement of the operating handle causes the nearly immediate application of the fluid pressure braking system.

Often times, however, the lock-out magnet becomes defective. Lock-out magnet defects may cause the simultaneous application of both braking systems at undesirable times. This may lead to sudden jarring in train movement. Moreover, an unwanted simultaneous application of the two braking systems may lock the vehicle's wheels causing the vehicle to move down the tracks in a skid configuration. This skidding causes wearing of flat spots on the wheels. Flat spots contribute to an undesirable bumping when the wheels again revolve.

According to the present invention means are provided for sensing the amount of fluid pressure existing in the braking cylinders. The apparatus of the present invention is electrically connected to the dynamic braking system and at a predetermined pressure level switches off the dynamic brake. Thus, in the event of a lock-out magnet malfunction, the inventive apparatus prevents the simultaneous application of both braking modes. The vehicle can then be slowed or stopped without undesirable wheel lock.

It is therefore an object of the present invention to provide a method and apparatus preventing an undesirable application of the dynamic and fluid braking systems.

It is another object of the present invention to provide a method and apparatus for turning off the dynamic braking system as a retarding force owing to lock-out magnet malfunction.

It is still a further object of the present invention to provide a method and apparatus preventing unwanted wheel lock.

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention to which reference should be made to the appended claims.

The drawing discloses a block diagram according to the present invention.

Referring now to the FIGURE there is shown the apparatus according to the present invention wherein a brake controller device 12 is provided with an operating handle 10 secured on a shaft 16. Controller device 12 which is common in the art contains a drum (not shown) capable of rotating with shaft 16 owing to manual rotation of handle 10. Conductor 14 electrically connects controller device 12 to dynamic brake 38. Shaft 16 extends through brake controller device 12 and engages air valve 18.

A pressure source 24 communicates through hose 22 to one side of air valve 18. Pressure source 24 supplies a fluid under pressure to air valve 18. Hose 20 extends from the other side of air valve 18 and communicates to one side of a lock-out magnet 26 as shown. It is to be understood that a manual rotation of handle 10 causes an electrical signal to the dynamic brake and positions a regulator (not shown) within air valve 18 controlling its output pressure.

Conductor 40 electrically connects dynamic brake 38 to lock-out magnet 26. Lock-out magnet 26 comprises a solenoid type device (not shown) as is common in the art, for regulating the fluid flow through it.

Hose 28 couples the output of lockout magnet 26 as shown to the input of air brake 30. Thus, a pressure drop, if any, existing across lockout magnet 26 is immediately felt at air brake 30. A pressure line 32 communicates the fluid pressure existing in air brake 30 to a pressure switch 34. Pressure switch 34 is electrically connected to an input of dynamic braking device 38 by means of conductor 36.

In the operation, a motorman's request for braking is communicated to handle 10 by means of shaft 16 to both brake controller device 12 and air valve 18. Dynamic brake 38 is turned on by electrical conductor 14. Conductor 40 electrically couples the output of dynamic brake 38 to lock-out magnet or solenoid 26. At sufficiently high dynamic or electrical output, lock-out magnet 26 blocks pressure to air brake 30. At this point the braking force comes exclusively from the dynamic effect caused by conversion of the motors to electric generators.

As the vehicle slows, the decreasing electric output received by lock-out magnet 26 causes an increasing application of fluid pressure to brakes 30. A point is then reached when fluid pressure brakes 30 provide the only slowing force on the vehicle.

Pressure switch 34 is coupled to fluid pressure brake 30 by means of hose 32 and continually senses the pressure in the brake cylinders.

When the train has sufficient speed to utilize dynamic brake 38, a lock-out magnet malfunction will cause an undesirable application of air brake 30. Pressure switch 34 senses this engagement of air brake 30, and at a predetermined pressure level, switch 34 operates means (not shown), to automatically shut down the dynamic system 38. Generally, shut down of the dynamic system would include opening of the circuit having load means (not shown) electrically connected across the dynamic braking motors. In particular, this might include a solenoid (not shown) connected to lead 36 to open circuit a load across the electric generators. For example, the load may comprise ballast resistors connected across the output of the electric generators for converting the electricity to heat. Thus, by removing the load across the dynamic motors, the simultaneous application of both fluid pressure braking apparatus and the dynamic braking system is prevented. Consequently, the only braking exerted against the vehicle is that exhibited by fluid pressure brake 30. The above-described method and apparatus avoids both undesirable wheel lock and vehicle movement.

While only a single embodiment of the present invention has been shown and described, it will be understood that many changes and modifications may be made without departing from the spirit and scope of the invention.

What is claimed is:

1. In a vehicle braking system of the type having a controller regulating the degree of brake application, an air valve, a pressure source whose application is governed by the air valve, and including a dynamic brake having a load electrically connected across the dynamic braking motors, a lock-out magnet determining the application of the fluid pressure to an air brake in response to the dynamic brake, the air brake being connected through a pressure line to the output of the lock-out magnet, wherein the improvement comprises:
   a pressure switch connected to the pressure line at the output of the lock-out magnet for sensing the pressure in the air brake said switch being set at a predetermined pressure level;
   a solenoid located between the load and the dynamic brake for electrically disconnecting the load; and
   a conductor connected between said pressure switch and said coupling means so that when the lock-out magnet fails to regulate the application of the fluid pressure brakes and the dynamic braking motors, at the predetermined pressure level said switch sends an electrical signal through said conductor causing said solenoid to disconnect the load from the dynamic braking motors.

2. In a vehicle braking system of the type recited in claim 1, wherein the load electrically connected across the dynamic braking motors includes heat dissapating ballast resistors.

* * * * *